(12) United States Patent
Tran et al.

(10) Patent No.: US 11,801,931 B2
(45) Date of Patent: Oct. 31, 2023

(54) INTEGRATION DRIVING MECHANISM FOR FIN CONTROL ASSEMBLY FOR FLYING EQUIPMENT, UAVS, AERIAL OBSERVATION EQUIPMENT AND THE LIKE

(71) Applicant: VIETTEL GROUP, Ha Noi (VN)

(72) Inventors: Quoc Toan Tran, Lai Chau Province (VN); Kim Bao Le, Vinh Phuc Province (VN); Van Dinh Pham, Ha Noi (VN); Duy Tung Nguyen, Ha Noi (VN); Pham Tuan Nguyen, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 0 days.

(21) Appl. No.: 17/726,991

(22) Filed: Apr. 22, 2022

(65) Prior Publication Data
US 2022/0340255 A1     Oct. 27, 2022

(30) Foreign Application Priority Data
Apr. 26, 2021  (VN) ............................... 1-2021-02311

(51) Int. Cl.
*B64C 5/06*     (2006.01)
*B64C 5/16*     (2006.01)
*F42B 10/64*    (2006.01)

(52) U.S. Cl.
CPC .................. *B64C 5/16* (2013.01); *B64C 5/06* (2013.01); *F42B 10/64* (2013.01)

(58) Field of Classification Search
CPC ......... F42B 10/64; B64C 23/072; B64C 5/06; B64C 5/16
See application file for complete search history.

(56) References Cited

U.S. PATENT DOCUMENTS 8,921,749 B1 * 12/2014 Scott ...................... F42B 10/14
                                                   244/3.28

FOREIGN PATENT DOCUMENTS

CN          111351399 A  *  6/2020

* cited by examiner

*Primary Examiner* — Tye William Abell
(74) *Attorney, Agent, or Firm* — patenttm.us

(57) ABSTRACT

Integration driving mechanism for fin control assembly applied for UAV, aerial observation equipment, comprises: the control assembly, the fin root assembly, the fin shaft. The control assembly is small size, high temperature operation, waterproof ability, vibration resistance, easily replacement and reparation that is still warrant the operation condition.

7 Claims, 3 Drawing Sheets

INTEGRATION DRIVING MECHANISM FOR FIN CONTROL ASSEMBLY FOR FLYING EQUIPMENT, UAVS, AERIAL OBSERVATION EQUIPMENT AND THE LIKE

FIELD OF INVENTION

This integration driving mechanism is applied for fin control assembly. Specifically, this invention relates with integration driving mechanism applied for driving fin assembly on flying equipment, unmanned aerial vehicle (UAV), aerial observation equipment.

DESCRIPTION OF RELATED ART

Aerial observation equipment and UAV have grown up rapidly in recent years. Since this equipment is controlled by autopilot, the driving mechanism is very important. This equipment is applied wisely in civilian and military applications. Especially, aerospace equipment is highly requires driving mechanisms having features such as small size, light weight, high performance, big load, easy control, high reliability, ability to survive harsh operation conditions.

There are many kinds of the different driving mechanism. However, each type of driving mechanism has different advantages and disadvantages.

In case of rotary motion mechanism, the structure includes spur gear transmissions that are integrated under a driving fin. The principle of rotary driving mechanism is transformation of the rotary motion of motor into the rotary motion of the driving fin through slower gear transmission. However, the spur gear transmissions have some disadvantages such as the torque impacts on gears are bigger than bevel gear, must using intermediate transmission shaft, complex integration.

To improve the weakness of previous design, the authors propose a new mechanism with integration driving mechanism applied for fin control assembly. Wherein, fin-mounted driving mechanism is modularized to be convenient for disassembly and integration process. The driving mechanism uses the spur gear and bevel gear transmissions to change the rotation speed and direction. The rotary sensor is integrated to increase the accuracy by close loop control system. Integration driving mechanism for fin control assembly can operate at hard environment conditions, high temperature, fast speed, large range.

Technical Essence of the Invention

The purpose of convention is propose integration driving mechanism for fin assembly with small size, light weight, large power, fast response, high reliability and consistent operation in harsh environment conditions.

To achieve the above purposes, integration driving mechanism for fin control assembly comprises:

The control assembly (1) which is a pedestal for driving mechanism and is assembled with the fin root (3) by screw (2); Fin 4 has the optimal dynamic shape to drive the equipment; Rotational motion is transformed from the control assembly 1 to the fin 4 by the fin shaft assembly 5; Coupling 6 connects the driving source with fin shaft assembly. The movement source includes:

The fin root (3) which is a pedestal for the fin assembly with a hole to assemble fin (4) and shaft (5);

In this invention, control circuit board (1) receives pulse signal from computer to activate the motor, the motor torque is transformed to the fin shaft through the gear pairs with reduced speed and increased torque wherein:

The first spur gear pair comprises the first spur gear (1.2) and the second spur gear (1.3); The spur gear pair includes the third spur gear (1.4) and the fourth spur gear (1.5); The third spur gear pair comprises the fifth spur gear (1.6) and the sixth spur gear (1.7); The first bevel gear pair includes the first bevel gear (1.8) and the second bevel gear (1.9);

The motor torque is transformed through the spur gears and bevel gears to the fin shaft (5), the torque transmission process multiplies the motor torque value and changes the motion shaft direction 90 degrees.

The precision is assured by rotary sensor 1.17 assembled at the end of the shaft. The control system is closed loop control to compensate the operating tolerance or error.

Integration driving mechanism for fin control assembly is small size, easily integrated due to modularization, convenient for maintenance and repair, replacement; integration driving mechanism can operate at hard environment conditions with operation temperature from $-30°$ C.$\div 100°$ C., vibration resistance, waterproof ability and high humidity environment.

DETAILED DESCRIPTION OF THE INVENTION

Figure 1:
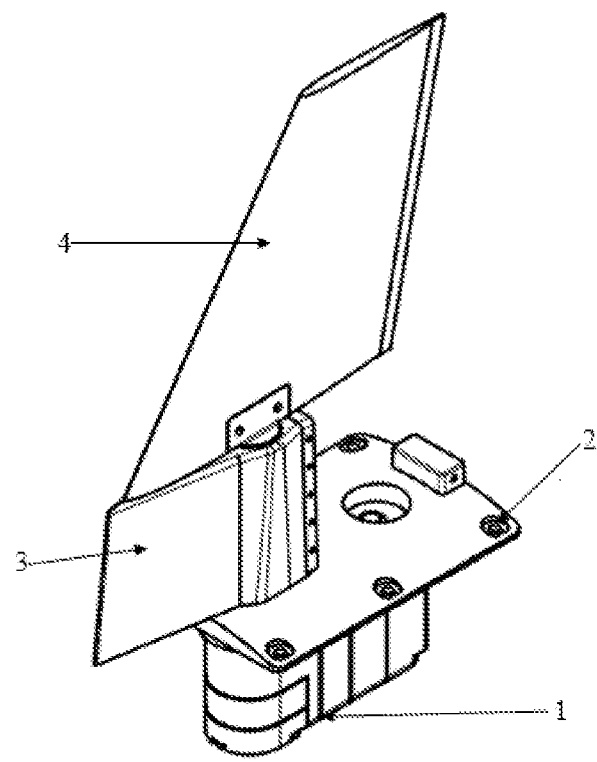
FIG. 1 is axonometric view of integration driving mechanism for control fin assembly.
Figure 2:
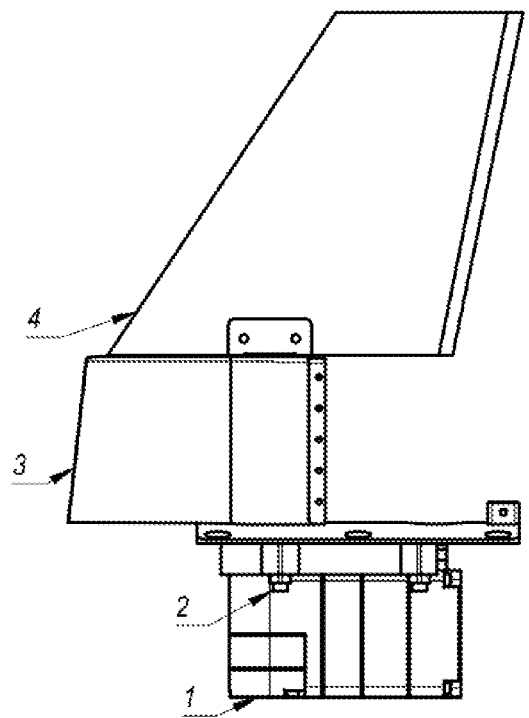
FIG. 2 describes elevation view of integration driving mechanism for fin control assembly.
Figure 3:
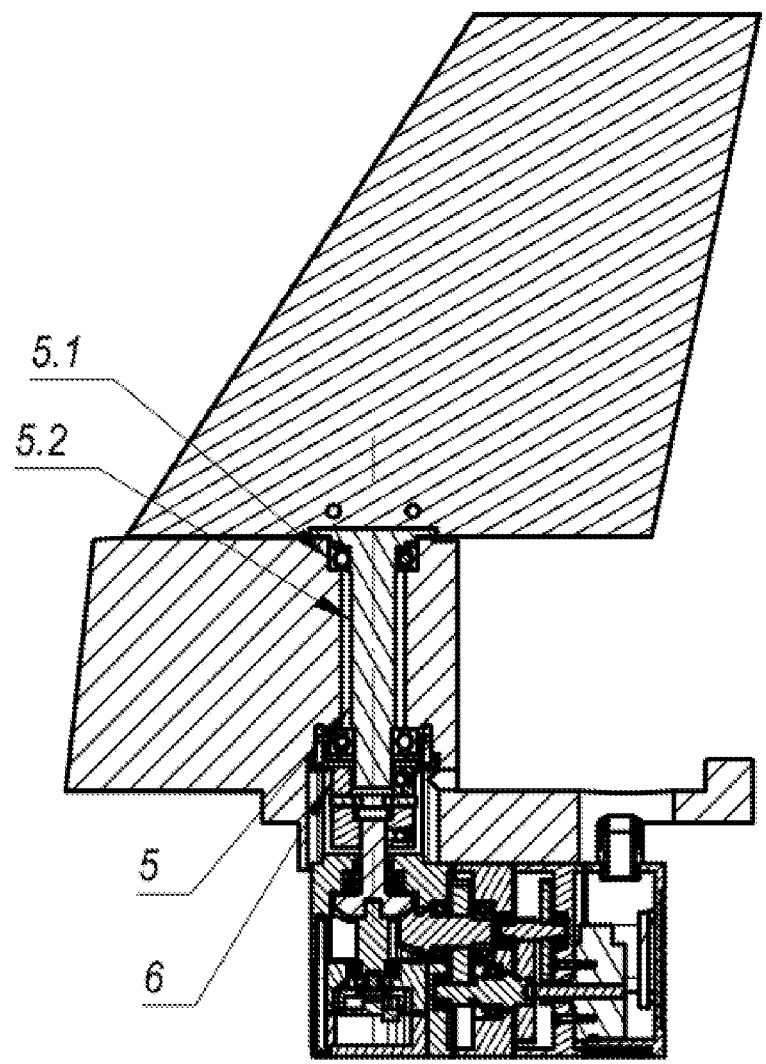
FIG. 3 describes cross-elevation view of integration driving mechanism for fin control assembly.
Figure 4:
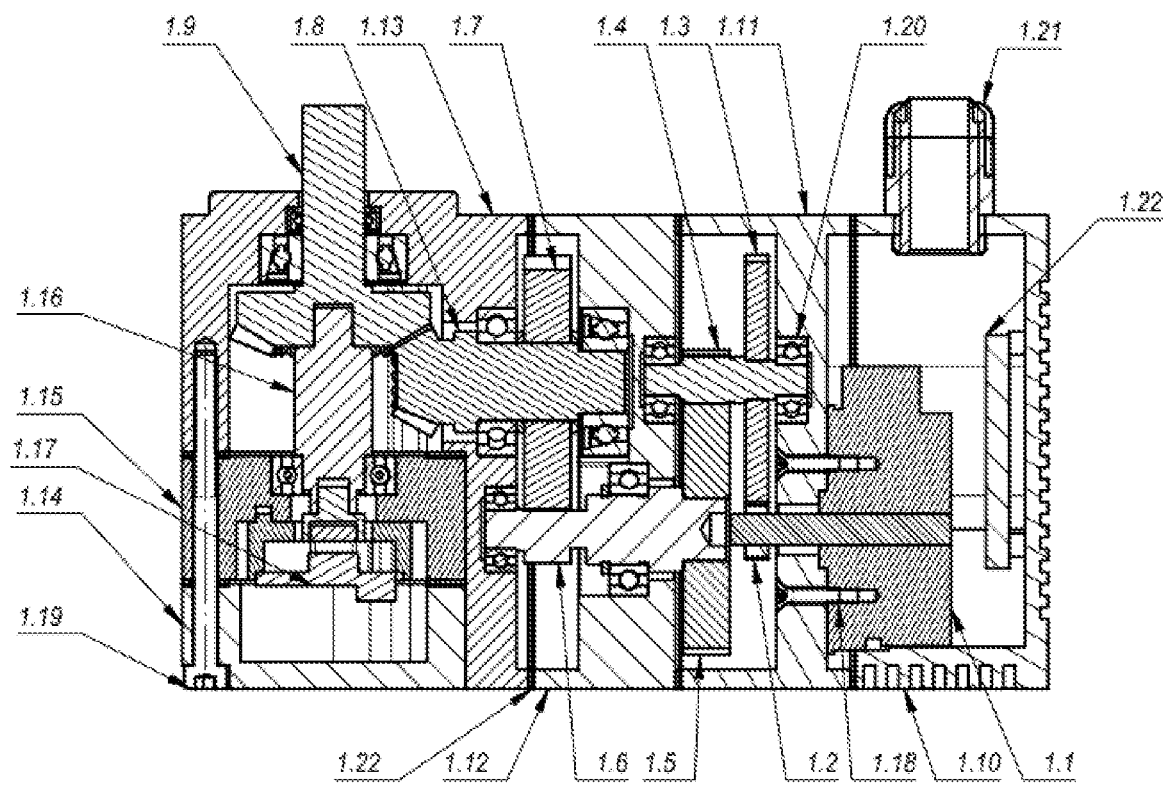
FIG. 4 describes elevation view of the fin control assembly.
Figure 5:
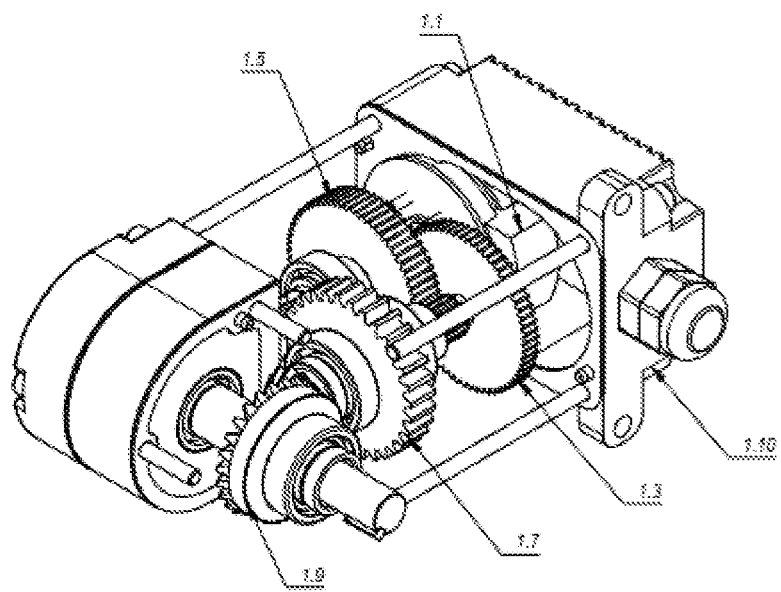
FIG. 5 describes axonometric view of the fin control assembly.

The purpose of this invention is to provide an integration driving mechanism for the fin control assembly that is lightweight, high performance, fast response, and operating ability in harsh environments. Integration driving mechanism is modularized to be comfortable for assembly, integration and maintenance. Such as description in the reference figure from FIG. 1 to FIG. 5, the structure of this invention includes partially components is assembled together as follows:

Integration driving mechanism for fin control assembly includes: Control assembly 1 is pedestal for driving mechanism and is assembled with the fin root 3 by screw 2; The fin root 3 is pedestal for the fin assembly with a hole to assemble fin 4 and shaft 5; Fin 4 has the optimal aerodynamic shape to drive the flying equipment; Rotational motion is transformed from the control assembly 1 to the shaft assembly 5 by the shaft 5; Coupling 6 connects the movement source with fin assembly; The movement source includes:

Control assembly 1 includes motion transmission system, cover and control system, wherein: The motion transmission system includes motor assembly 1.1, first spur gear 1.2, second spur gear 1.3, third spur gear 1.4, fourth spur gear 1.5, fifth spur gear 1.6, sixth spur gear 1.7, first bevel gear 1.8, second bevel gear 1.9, bearing 1.20; Cover system includes first cover 1.10, second cover 1.11, third cover 1.12, fourth cover 1.13, fifth cover 1.14, sixth cover 1.15, first screw 1.18, second screw 1.19, metal cable gland connector 1.21; Control system includes sensor shaft 1.16, rotary sensor 1.17, control circuit board 1.22

Motion transmission system is structured from steel gears, steel alloy gears or aluminum gears; Gears are calculated to assure the durability with load; number of spur gears depends on load requirement impacting on control fin assembly; Spur gears in this system can be replaced by helical gears, gears are assembled with shaft by key or laser welding; Bevel gears are used in this system can be spur bevel gear or spiral bevel gear; Bearings are assembled on each shaft ends to reduce friction force and increase speed.

Cover system is manufactured from steel alloy, aluminum alloy, plastics or composite; The reference holds and pins are manufactured on cover to ensure precision integration ability; The cover is designed with bearing hubs; The covers are assembled together by the first screw 1.18, second screw 1.19; The cable gland connector 1.20 assures waterproof ability when the electrical wire is throughout, control assembly can be covered by heat isolation layer.

About working principle of the control assembly, control circuit board 1 receives pulse signal from computer to active the movement motor, rotary motor transforms the torque through the gear pairs to increase torque on the fin shaft, the first gear pair between the first spur gear 1.2 and second spur gear 1.3; The second spur gear pair includes the third spur gear 1.4 and the fourth spur gear 1.5; The third spur gear pair includes the fifth spur gear 1.6 and the sixth spur gear 1.7; The torque is transmitted into the sixth spur gear and impacts on the first bevel gear shaft 1.8, the torque is transmitted in the second bevel gear 1.9, the second bevel torque is transmitted into the fin shaft through coupling 6 to make the fin assembly 5 movement, the torque is changed the direction from input to output, the bevel gear pair reduces the torque impacting directly on the shaft 1.16, the precision is assured by rotary sensor 1.17 assembled at the end of the shaft, the control system is closed loop control to increase the accuracy.

The fin root assembly 3 is made by steel alloy, aluminum alloy with optimal aerodynamic shape, there is a hole in the middle to assemble the fin assembly 5.

The fin shaft assembly 5 is made by steel alloy, aluminum alloy, cylinder shape, the fin shaft assembly includes the fin shaft 5.1 and bearing 5.2.

The coupling 6 is made by steel alloy or aluminum alloy, applied to connect the two shafts that can be eccentric, easily disassembled.

The structure is described as above, integration driving mechanism for fin control assembly has working principle as follows: The control circuit board receives pulse signal from computer, it actives the motor and torque transformation into spur gear pairs, this gear assembly transforming torque into the bevel gear pairs. The bevel gear shaft is linked with coupling and fin shaft to transmit the movement into driving fin. This process is controlled by closed loop through the rotary sensor.

Integration driving mechanism for fin control assembly is small size, integrated easily due to modularity, suitable to be maintained and repaired, suitable for fast replacement; driving mechanism can be disassembled by removing screws; due to the special design, driving mechanism can operate in temperature from −30° C. to 100° C., having vibration resistance, waterproof ability and high humidity resistance. Possible Effect of the Convention Integration driving mechanism for fin control assembly is used on UAV, aerospace equipment.

Integration driving mechanism for fin control assembly can operate with speed from 0÷400°/s, angular range±90°, operation temperature−30÷100° C., high performance, IP68 protection, high reliability, MIL-STD-810G vibration resistance.

The invention claimed is:

1. An integration driving mechanism for a fin control assembly comprising:
    a control assembly forming a driving mechanism base integrated with a fin root assembly by screws;
    the fin root assembly providing a base to integrate a main cylinder and a fin shaft;
    a fin having an aerodynamic shape to drive the flying equipment;
    a fin shaft assembly for transforming force from the control assembly to the fin; and
    a coupling used to connect a force transmission system and the fin shaft assembly, wherein:
    the control assembly is structured to include the force transmission system, a cover system and a control system, wherein:
    the force transmission system includes a motor, a first spur gear, a second spur gear, a third spur gear, a fourth spur gear, a fifth spur gear, a sixth spur gear, a first bevel gear shaft, a second bevel gear shaft, and a plurality of bearings;
    the cover system includes a first cover, a second cover, a third cover, a fourth cover, a fifth cover, a sixth cover, a first screw, a second screw, and a cable gland connector;
    the control system includes a sensor shaft, a rotary sensor, and a control circuit board;
    the covers of the cover system are made from steel alloy, aluminum alloy, plastic or composite and comprise reference holes or pins on the covers;
    the cover system is designed with bearing hubs, the covers are assembled together by screws;
    wires pass through the cable gland connector to provide waterproof features;
    the force transmission system comprises gears that are made of steel alloy or aluminum alloy;
    the number of gears depends on a load requirement;
    the gears are designed as spur, helical, spiral or bevel gears; and
    the gears are integrated with the shafts by keys, the shafts are assembled on the covers by bearings.

2. The integration driving mechanism for the fin control assembly according to claim 1 wherein:
    the fin root assembly is made from steel alloy or aluminum alloy that has an aerodynamic shape and a hole in the middle to assemble the fin shaft.

3. The integration driving mechanism for the fin control assembly according to claim 1 wherein:
    the fin is made from steel alloy, aluminum alloy, plastic, composite that has an aerodynamic shape.

4. The integration driving mechanism for the fin control assembly according to claim 1 wherein:
    the fin shaft assembly is made from steel alloy, or aluminum alloy that has a cylinder shape, the fin shaft assembly includes the fin shaft and bearings.

5. The integration driving mechanism for the fin control assembly according to claim 1 wherein a heat isolation layer is provided to protect the control system assembly.

6. The integration driving mechanism for the fin control assembly according to claim 1 wherein:
    the coupling is made from steel alloy, aluminum alloy, or a combination of steel and aluminum alloy shaped based on operation conditions.

7. The integration driving mechanism for the fin control assembly according to claim 6, wherein the coupling comprises a splined shaft.

\* \* \* \* \*